(12) United States Patent
Craig et al.

(10) Patent No.: US 11,732,590 B2
(45) Date of Patent: Aug. 22, 2023

(54) TRANSITION SECTION FOR ACCOMMODATING MISMATCH BETWEEN OTHER SECTIONS OF A COOLING APERTURE IN A TURBINE ENGINE COMPONENT

(71) Applicant: Raytheon Technologies Corporation, Farmington, CT (US)

(72) Inventors: Brian Craig, Palm Beach Gardens, FL (US); James M. Koonankeil, Marlborough, CT (US); Brian T. Hazel, Avon, CT (US); Paul E. Denney, Northborough, MA (US); Dominic J. Mongillo, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/401,927

(22) Filed: Aug. 13, 2021

(65) Prior Publication Data

US 2023/0050204 A1 Feb. 16, 2023

(51) Int. Cl.
*F01D 5/18* (2006.01)
*F01D 25/12* (2006.01)

(52) U.S. Cl.
CPC ............. *F01D 5/186* (2013.01); *F01D 25/12* (2013.01); *F05D 2220/32* (2013.01); *F05D 2260/202* (2013.01)

(58) Field of Classification Search
CPC ...................................................... F01D 5/186
See application file for complete search history.

(56) References Cited

U.S. PATENT DOCUMENTS

| 4,738,588 | A | * | 4/1988 | Field | ....................... | F01D 5/186 |
| | | | | | | 415/115 |
| 4,762,464 | A | | 8/1988 | Vertz | | |
| 6,092,982 | A | | 7/2000 | Ikeda | | |
| 6,234,755 | B1 | | 5/2001 | Bunker | | |
| 6,368,060 | B1 | * | 4/2002 | Fehrenbach | .......... | F04D 29/584 |
| | | | | | | 416/97 R |

(Continued)

FOREIGN PATENT DOCUMENTS

| CN | 111665806 A | 9/2020 |
| EP | 985802 A | 3/2000 |

(Continued)

OTHER PUBLICATIONS

EP search report for EP22190363.6 dated Dec. 16, 2022.

*Primary Examiner* — Courtney D Heinle
*Assistant Examiner* — John S Hunter, Jr.
(74) *Attorney, Agent, or Firm* — Getz Balich LLC (57) ABSTRACT

An apparatus is provided for a turbine engine. This turbine engine apparatus includes a turbine engine component that includes a sidewall and a cooling aperture. The cooling aperture includes an inlet, an outlet, a meter section, a diffuser section and a transition section between and fluidly coupled with the meter section and the diffuser section. The cooling aperture extends through the sidewall from the inlet to the outlet. The meter section is at the inlet. The diffuser section is at the outlet. The transition section is configured to accommodate lateral misalignment between the meter section and the diffuser section.

17 Claims, 10 Drawing Sheets

(56) References Cited

U.S. PATENT DOCUMENTS

| | | |
|---|---|---|
| 6,420,677 B1 | 7/2002 | Emer |
| 6,663,919 B2 | 12/2003 | Farmer |
| 6,909,800 B2 | 6/2005 | Vaidyanathan |
| 7,019,257 B2 | 3/2006 | Stevens |
| 7,041,933 B2 | 5/2006 | Forrester |
| 7,328,580 B2 | 2/2008 | Lee |
| 7,820,267 B2 | 10/2010 | Fahndrich |
| 7,964,087 B2 | 6/2011 | Lee |
| 7,997,868 B1 | 8/2011 | Liang |
| 8,057,181 B1 | 11/2011 | Liang |
| 8,157,526 B2 | 4/2012 | Beck |
| 8,168,912 B1 | 5/2012 | Liang |
| 8,245,519 B1 | 8/2012 | Liang |
| 8,672,613 B2 | 3/2014 | Bunker |
| 8,814,500 B1 | 8/2014 | Liang |
| 8,905,713 B2 | 12/2014 | Bunker |
| 9,468,991 B2 | 10/2016 | McDowell |
| 9,518,317 B2 | 12/2016 | Eminoglu |
| 9,598,979 B2 | 3/2017 | Reed |
| 9,650,900 B2 | 5/2017 | Malak |
| 9,696,035 B2 | 7/2017 | Starkweather |
| 9,765,623 B2 | 9/2017 | Kottilingam |
| 9,945,233 B2 | 4/2018 | Tanaka |
| 10,006,293 B1 | 6/2018 | Jones |
| 10,113,433 B2 | 10/2018 | Morris |
| 10,208,602 B2 | 2/2019 | Thornton |
| 10,280,763 B2 | 5/2019 | Torkaman |
| 10,309,239 B2 * | 6/2019 | Spangler ................ F01D 9/065 |
| 10,350,684 B2 | 7/2019 | Bunker |
| 10,422,230 B2 * | 9/2019 | Lewis ..................... F01D 25/12 |
| 10,619,499 B2 | 4/2020 | Kottilingam |
| 10,773,344 B2 * | 9/2020 | Lewis ....................... B23H 9/10 |
| 10,815,796 B2 | 10/2020 | Burd |
| 2005/0092725 A1 | 5/2005 | Byrd |
| 2009/0169394 A1 | 7/2009 | Crow |
| 2009/0248355 A1 | 10/2009 | Kriegmair |
| 2010/0192588 A1 * | 8/2010 | Gerendas ............ B23K 26/389 |
| | | 60/752 |
| 2010/0282721 A1 | 11/2010 | Bunker |
| 2012/0102959 A1 | 5/2012 | Starkweather |
| 2012/0167389 A1 | 7/2012 | Lacy |
| 2012/0205355 A1 | 8/2012 | Münzer |
| 2014/0271129 A1 | 9/2014 | Mueller |
| 2014/0271229 A1 | 9/2014 | Nita |
| 2016/0193667 A1 | 7/2016 | Luketic |
| 2016/0356498 A1 | 12/2016 | Gerendas |
| 2017/0089579 A1 | 3/2017 | Bunker |
| 2017/0261208 A1 | 9/2017 | Starkweather |
| 2017/0268347 A1 | 9/2017 | Dahlke |
| 2017/0320163 A1 | 11/2017 | Hu |
| 2017/0335691 A1 | 11/2017 | Crites |
| 2018/0230811 A1 | 8/2018 | Lewis |
| 2018/0361512 A1 * | 12/2018 | Lewis ..................... F01D 25/12 |
| 2019/0085705 A1 | 3/2019 | Webster |
| 2019/0101004 A1 | 4/2019 | Rudolph |
| 2019/0134752 A1 | 5/2019 | Grafton-Reed |
| 2020/0190990 A1 | 6/2020 | Hohenstein |
| 2020/0217207 A1 | 7/2020 | Loebig |
| 2021/0060709 A1 | 3/2021 | Thayer |
| 2022/0034230 A1 | 2/2022 | Ikehara |

FOREIGN PATENT DOCUMENTS

| | | |
|---|---|---|
| EP | 1967696 B1 | 3/2017 |
| EP | 2886798 B1 | 10/2018 |
| GB | 2389330 B | 5/2004 |
| WO | 2020068130 A1 | 4/2020 |

* cited by examiner

TRANSITION SECTION FOR ACCOMMODATING MISMATCH BETWEEN OTHER SECTIONS OF A COOLING APERTURE IN A TURBINE ENGINE COMPONENT

BACKGROUND OF THE DISCLOSURE

1. Technical Field

This disclosure relates generally to a turbine engine and, more particularly, to cooling apertures in a component of the turbine engine.

2. Background Information

A gas turbine engine includes various fluid cooled components such as turbine blades and turbine vanes. Such fluid cooled components may include one or more cooling apertures extending through a sidewall of the respective component. Various cooling aperture types and configurations are known in the art. While these known cooling apertures have various benefits, there is still room in the art form improvement.

SUMMARY OF THE DISCLOSURE

According to an aspect of the present disclosure, an apparatus is provided for a turbine engine. This turbine engine apparatus includes a turbine engine component that includes a sidewall and a cooling aperture. The cooling aperture includes an inlet, an outlet, a meter section, a diffuser section and a transition section between and fluidly coupled with the meter section and the diffuser section. The cooling aperture extends through the sidewall from the inlet to the outlet. The meter section is at the inlet. The diffuser section is at the outlet. The transition section is configured to accommodate lateral misalignment between the meter section and the diffuser section.

According to another aspect of the present disclosure, another apparatus is provided for a turbine engine. This turbine engine apparatus includes a turbine engine component that includes a wall and a cooling aperture. The cooling aperture extends through the wall. The cooling aperture includes a first section, a second section and a transition section between and fluidly coupled with the first section and the second section. The transition section meets the first section at a first interface. A cross-sectional geometry of the transition section at the first interface is different than a cross-sectional geometry of the first section at the first interface. The transition section meets the second section at a second interface. The transition section and the second section share a common cross-sectional geometry at the second interface.

According to still another aspect of the present disclosure, another apparatus is provided for a turbine engine. This turbine engine apparatus includes a turbine engine component that includes a wall and a cooling aperture. The turbine engine component is configured as an airfoil or a flowpath wall for the turbine engine. The cooling aperture extends through the wall. The cooling aperture includes a first section, a second section and a transition section between and fluidly coupled with the first section and the second section. The transition section forms a groove within the wall. The groove projects laterally into the wall. The groove extends longitudinally within the wall between the first section and the second section.

The second section may be configured as or otherwise include a multi-lobe diffuser section.

The cooling aperture may also include an inlet and an outlet. The first section may extend within the wall from the inlet to the transition section. The second section may extend within the wall from the transition section to the outlet.

The transition section may laterally taper as the transition section extends within the wall from the second section to the first section.

One of the first section and the second section may be configured as or otherwise include a meter section of the cooling aperture. Another one of the first section and the second section may be configured as or otherwise include a diffuser section of the cooling aperture.

The meter section may meet the transition section at an interface. A cross-sectional geometry of the meter section at the interface may be different than a cross-sectional geometry of the transition section at the interface.

A shape of the cross-sectional geometry of the meter section at the interface may be different than a shape of the cross-sectional geometry of the transition section at the interface.

A dimension of the cross-sectional geometry of the meter section at the interface may be different than a corresponding dimension of the cross-sectional geometry of the transition section at the interface.

The diffuser section may meet the transition section at a second interface. The diffuser section and the transition section may share a common cross-sectional geometry at the second interface.

A shoulder may be formed at an interface between the meter section and the transition section.

A centerline of the diffuser section may be laterally misaligned with a centerline of the meter section.

A centerline of the transition section may be laterally aligned with the centerline of the diffuser section.

The sidewall may include a substrate and an outer coating applied over the substrate. The meter section and the transition section may be formed in the substrate. The diffuser section may be formed in the substrate and the outer coating.

The sidewall may also include an inner coating between the outer coating and the substrate. The diffuser section may also be formed in the inner coating.

The diffuser section may be configured as or otherwise include a single lobe diffuser section.

The diffuser section may be configured as or otherwise include a multi-lobe diffuser section.

The turbine engine component may be configured as an airfoil for the turbine engine.

The turbine engine component may be configured as a flowpath sidewall for the turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes fluid cooled components of a gas turbine engine. For ease of description, the turbine engine may be described below as a turbofan turbine engine. The present disclosure, however, is not limited to such an exemplary gas turbine engine. The turbine engine, for example, may alternatively be configured as a turbojet turbine engine, a turboprop turbine engine, a turboshaft turbine engine, a propfan turbine engine, a pusher fan turbine engine or an auxiliary power unit (APU) turbine engine. The turbine engine may be configured as a geared turbine engine or a direct drive turbine engine. The present disclosure is also not limited to aircraft applications. The turbine engine, for example, may alternatively be configured as a ground-based industrial turbine engine for power generation, or any other type of turbine engine which utilizes fluid cooled components.

Figure 1:
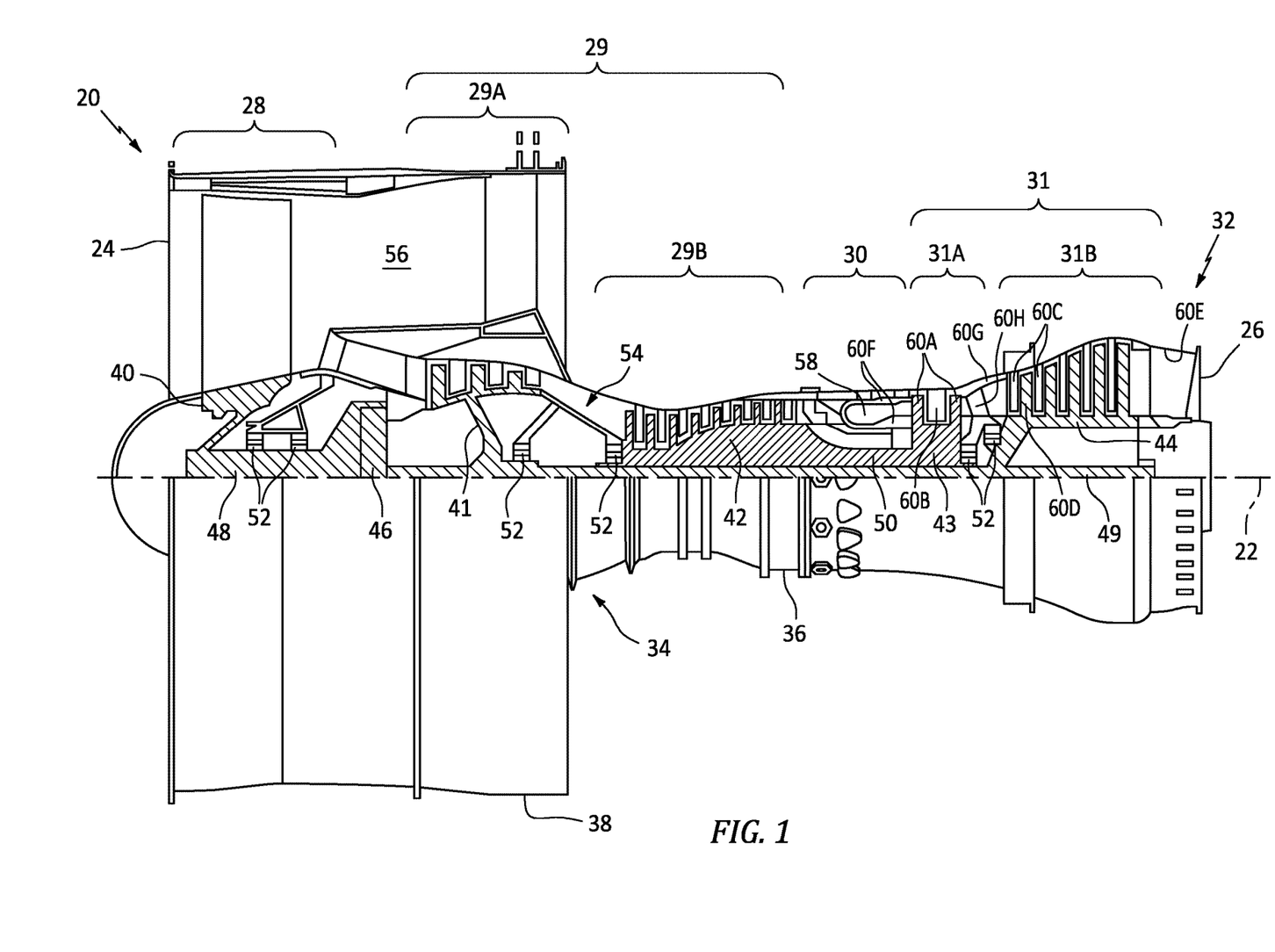
FIG. 1 is a side cutaway illustration of a geared turbofan turbine engine.

FIG. 1 is a side cutaway illustration of the turbofan turbine engine 20. This turbine engine 20 extends along an axial centerline 22 between a forward, upstream airflow inlet 24 and an aft, downstream airflow exhaust 26. The turbine engine 20 includes a fan section 28, a compressor section 29, a combustor section 30, a turbine section 31 and an exhaust section 32 (partially shown in FIG. 1). The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31 are arranged sequentially along the axial centerline 22 within an engine housing 34. This engine housing 34 includes an inner case 36 (e.g., a core case) and an outer case 38 (e.g., a fan case). The inner case 36 may house one or more of the engine sections 29A-31B; e.g., an engine core. The outer case 38 may house at least the fan section 28.

Each of the engine sections 28, 29A, 29B, 31A and 31B includes a respective rotor 40-44. Each of these rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 40 is connected to a gear train 46, for example, through a fan shaft 48. The gear train 46 and the LPC rotor 41 are connected to and driven by the LPT rotor 44 through a low speed shaft 49. The HPC rotor 42 is connected to and driven by the HPT rotor 43 through a high speed shaft 50. The shafts 48-50 are rotatably supported by a plurality of bearings 52; e.g., rolling element and/or thrust bearings. Each of these bearings 52 is connected to the engine housing 34 by at least one stationary structure such as, for example, an annular support strut.

During operation, air enters the turbine engine 20 through the airflow inlet 24. This air is directed through the fan section 28 and into a core flowpath 54 and a bypass flowpath 56. The core flowpath 54 extends sequentially through the engine sections 29A-32. The air within the core flowpath 54 may be referred to as "core air". The bypass flowpath 56 extends through a bypass duct, which bypasses the engine core. The air within the bypass flowpath 56 may be referred to as "bypass air".

The core air is compressed by the LPC rotor 41 and the HPC rotor 42 and directed into a combustion chamber 58 of a combustor in the combustor section 30. Fuel is injected into the combustion chamber 58 and mixed with the compressed core air to provide a fuel-air mixture. This fuel air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from a core airflow inlet. The rotation of the LPT rotor 44 also drives rotation of the fan rotor 40, which propels bypass air through and out of the bypass flowpath 56. The propulsion of the bypass air may account for a majority of thrust generated by the turbine engine 20, e.g., more than seventy-five percent (75%) of engine thrust. The turbine engine 20 of the present disclosure, however, is not limited to the foregoing exemplary thrust ratio.

The turbine engine 20 includes a plurality of fluid cooled components (e.g., 60A-H; generally referred to as "60") arranged within, for example, the combustor section 30, the turbine section 31 and/or the exhaust section 32. Examples of these fluid cooled components 60 include airfoils such as, but not limited to, a rotor blade airfoil (e.g., 60A, 60D) and a stator vane airfoil (e.g., 60B, 60C, 60H). Other examples of the fluid cooled components 60 include flowpath walls such as, but not limited to, a combustor wall (e.g., 60F), an exhaust duct wall (e.g., 60E), a shroud or other flowpath wall (e.g., 60G), a rotor blade platform and a stator vane platform. Of course, various other fluid cooled components may be included in the turbine engine 20, and the present disclosure is not limited to any particular types or configurations thereof.

Figure 2:
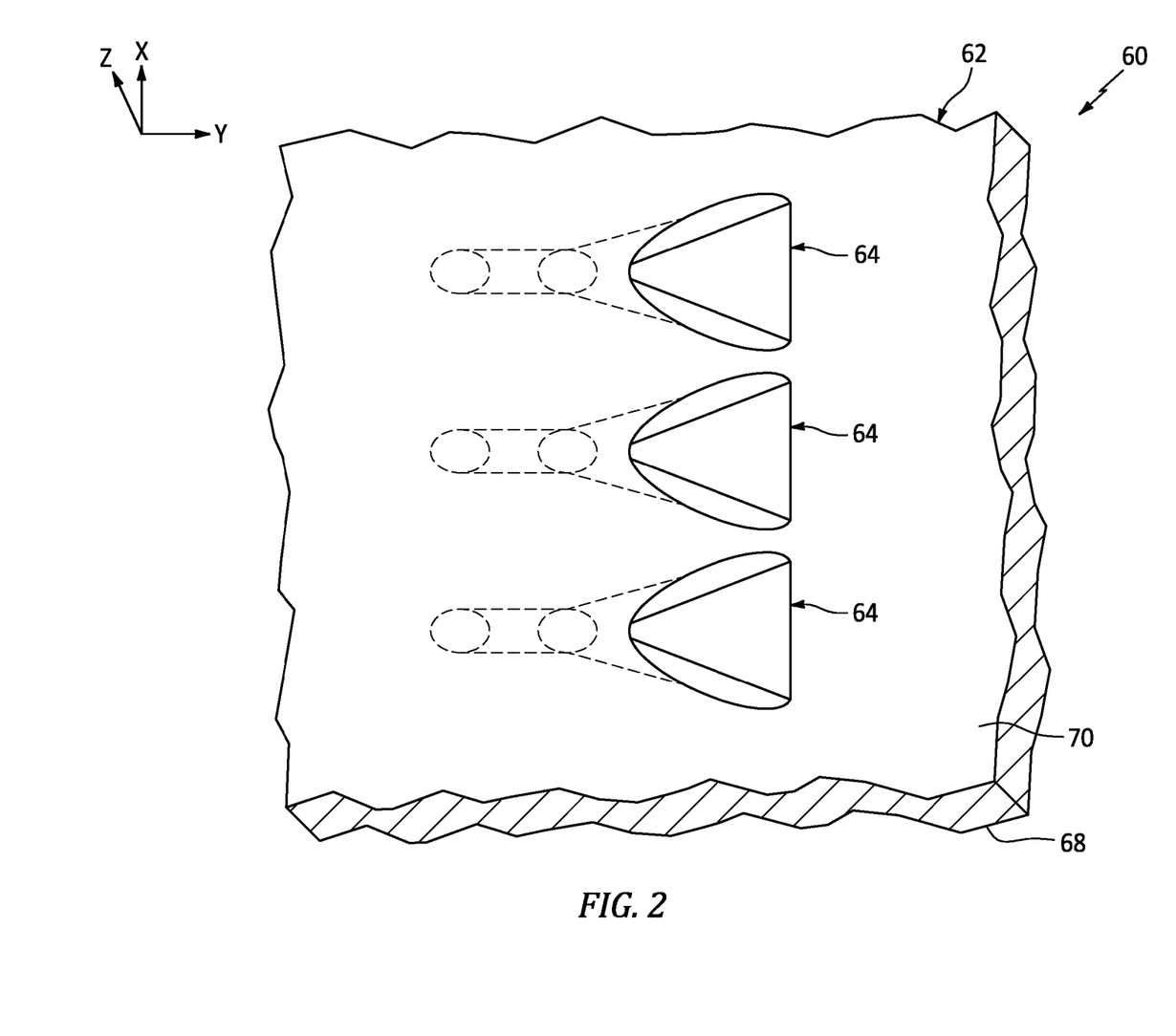
FIG. 2 is a perspective illustration of a portion of a fluid cooled component.

FIG. 2 illustrates a portion of one of the fluid cooled components 60 within the turbine engine 20. This fluid cooled component 60 has a component wall 62 (e.g., a sidewall or an endwall) configured with one or more cooling apertures 64.

Figure 3:
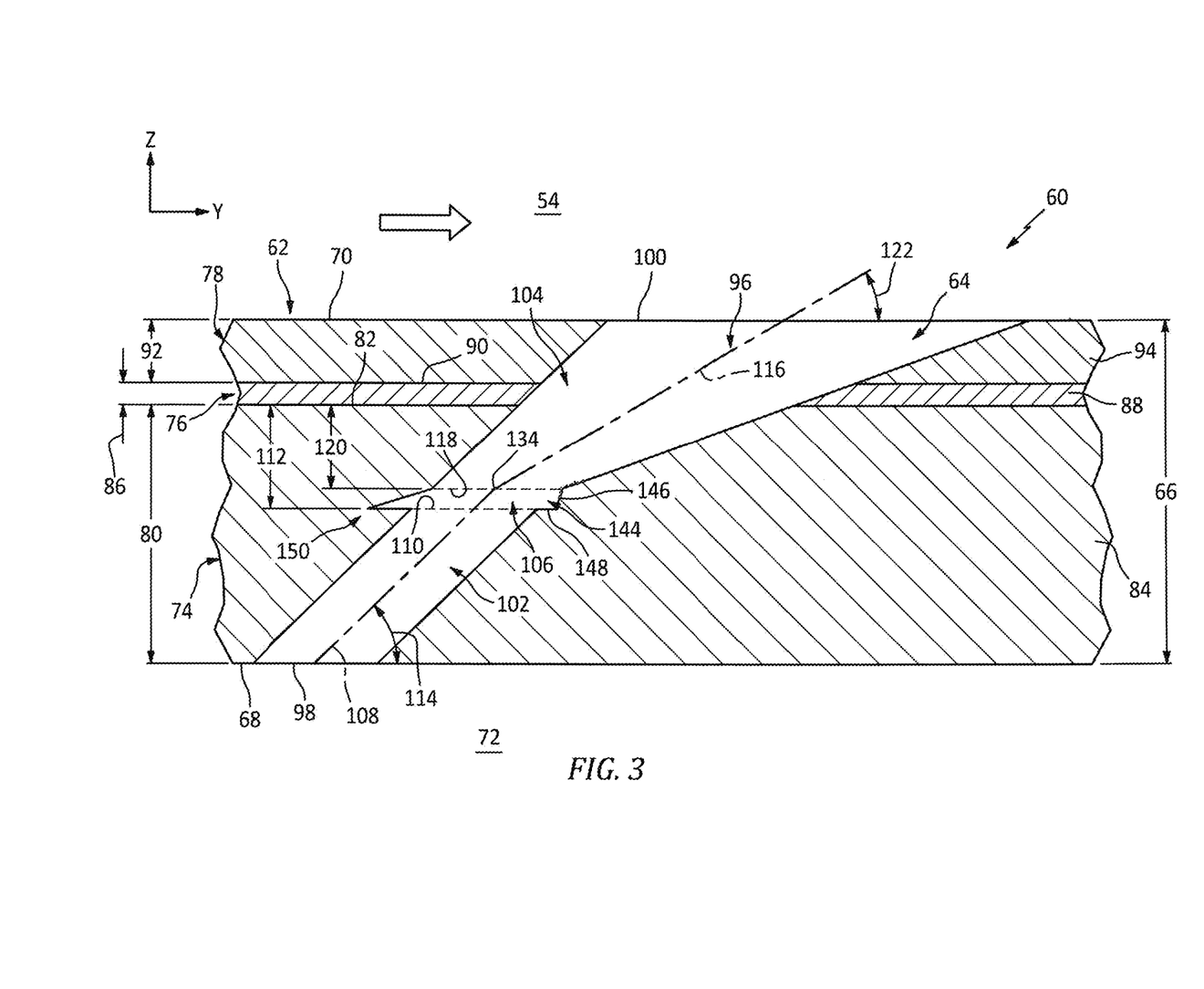
FIG. 3 is a sectional illustration of a portion of the fluid cooled component taken along a centerline of a cooling aperture.

Referring to FIG. 3, the component wall 62 has a thickness 66 that extends vertically (e.g., along a z-axis) between and to a first surface 68 and a second surface 70. The component first surface 68 may be configured as an interior and/or a cold side surface of the component wall 62. The component first surface 68, for example, may at least partially form a peripheral boundary of a cooling fluid volume 72 (e.g., a cavity or a passage) along the component wall 62. The component first surface 68 may thereby be subject to relatively cool fluid (e.g., cooling air) supplied to the cooling fluid volume 72. This cooling fluid volume 72 may be an internal volume formed within the fluid cooled component 60 where, for example, the component is an airfoil. Alternatively, the cooling fluid volume 72 may be an external volume formed external to the fluid cooled component 60 where, for example, the component is a flowpath wall. The component second surface 70 may be configured as an exterior and/or a hot side surface of the component wall 62. The component second surface 70, for example, may at least partially form a peripheral boundary of a portion of, for example, the core flowpath 54 along the component wall 62. The component second surface 70 may thereby be subject to relative hot fluid (e.g., combustion products) flowing through the core flowpath 54 within, for example, one of the engine sections 30-32 of FIG. 1.

The component wall 62 of FIG. 3 includes a component substrate 74 and one or more external component coatings 76 and 78. The component substrate 74 at least partially or completely forms and carries the component first surface 68. The component substrate 74 has a thickness 80 that extends vertically (e.g., along the z-axis) between and to the component first surface 68 and a second surface 82 of the component substrate 74. This substrate second surface 82 may be configured as an exterior surface of the component substrate 74 prior to being (e.g., partially or completely) covered by the one or more component coatings 76 and 78. The substrate thickness 80 may be greater than one-half (½) of the wall thickness 66. The substrate thickness 80, for example, may be between two-third (⅔) and four-fifths (⅘) of the wall thickness 66.

The component substrate 74 is constructed from substrate material 84. This substrate material 84 may be an electrically conductive material. The substrate material 84, for example, may be or otherwise include metal. Examples of the metal include, but are not limited to, nickel (Ni), titanium (Ti), aluminum (Al), chromium (Cr), cobalt (Co), and alloys thereof. The metal, for example, may be a nickel or cobalt based superalloy such as, but not limited to, PWA 1484 metal or PWA 1429 metal.

The inner coating 76 may be configured as a bond coating between the component substrate 74 and the outer coating 78. The inner coating 76 of FIG. 3 is bonded (e.g., directly) to the substrate second surface 82. The inner coating 76 at least partially or completely covers the substrate second surface 82 (e.g., along an x-y plane of FIG. 2). The inner coating 76 has a thickness 86 that extends vertically (e.g., along the z-axis) between and to component substrate 74 and the outer coating 78. This inner coating thickness 86 may be less than one-seventh (⅐) of the wall thickness 66. The inner coating thickness 86, for example, may be between one-eighth (⅛) and one-fortieth (1/40) of the wall thickness 66.

The inner coating 76 is constructed from inner coating material 88. This inner coating material 88 may be an electrically conductive material. The inner coating material 88, for example, may be or otherwise include metal. Examples of the metal include, but are not limited to, MCrAlY and MAlCrX, where "M" is nickel (Ni), cobalt (Co), iron (Fe) or any combination thereof, and where "Y" or "X" is hafnium (Hf), yttrium (Y), silicon (Si) or any combination thereof. The MCrAlY and MAlCrX may be further modified with strengthening elements such as, but not limited to, tantalum (Ta), rhenium (Re), tungsten (W), molybdenum (Mo) or any combination thereof. An example of the MCrAlY is PWA 286 metal.

The inner coating 76 may be formed from a single layer of the inner coating material 88. The inner coating 76 may alternatively be formed from a plurality of layers of the inner coating material 88, where the inner coating material 88 within each of those inner coating layers may be the same as one another or different from one another.

The outer coating 78 may be configured as a protective coating for the component substrate 74 and, more generally, the fluid cooled component 60. The outer coating 78, for example, may be configured as a thermal barrier layer and/or an environmental layer. The outer coating 78 at least partially or completely forms and carries the component second surface 70. The outer coating 78 of FIG. 2 is bonded (e.g., directly) to a second (e.g., exterior) surface 90 of the inner coating 76. The outer coating 78 at least partially or completely covers the inner coating second surface 90 as well as the underlying substrate second surface 82 (e.g., along an x-y plane of FIG. 2). The outer coating 78 has a thickness 92 that extends vertically (e.g., along the z-axis) between and to the inner coating 76 and the component second surface 70. This outer coating thickness 92 may be less than one-half (½) of the wall thickness 66. The outer coating thickness 92, for example, may be between one-third (⅓) and one-eighth (⅛) of the wall thickness 66. The outer coating thickness 92, however, may be greater than the inner coating thickness 86.

The outer coating 78 is constructed from outer coating material 94. This outer coating material 94 may be a non-electrically conductive material. The outer coating material 88, for example, may be or otherwise include ceramic. Examples of the ceramic include, but are not limited to, yttria stabilized zirconia (YSZ) and gadolinium zirconate (GdZ). The outer coating material 94 of the present disclosure is not limited to non-electrically conductive materials. In other embodiments, for example, the outer coating material 94 may be an electrically conductive material; e.g., metal.

The outer coating 78 may be formed from a single layer of the outer coating material 94. The outer coating 78 may alternatively be formed from a plurality of layers of the outer coating material 94, where the outer coating material 94 within each of those outer coating layers may be the same as one another or different from one another. For example, the outer coating 78 may include a thin interior layer of the YSZ and a thicker exterior later of the GdZ.

Each of the cooling apertures 64 extends along a respective longitudinal centerline 96 between and to an inlet 98 of the respective cooling aperture 64 and an outlet 100 of the respective cooling aperture 64. The cooling aperture inlet 98 of FIG. 3 is located in the component first surface 68. The cooling aperture inlet 98 thereby fluidly couples its respective cooling aperture 64 with the cooling fluid volume 72 along the component first surface 68. The cooling aperture outlet 100 of FIG. 3 is located in the component second surface 70. The cooling aperture outlet 100 thereby fluidly couples its respective cooling aperture 64 with the core flowpath 54 along the component second surface 70.

Each of the cooling apertures 64 may include a meter section 102, a diffuser section 104 and a transition section 106. The meter section 102 is disposed at (e.g., on, adjacent or proximate) the cooling aperture inlet 98. The meter section 102 is configured to meter (e.g., regulate) a flow of cooling fluid flowing from the cooling fluid volume 72, through the substrate material 84, to the diffuser section 104. The diffuser section 104 is disposed at the cooling aperture outlet 100. The diffuser section 104 is configured to diffuse the cooling fluid exhausted (e.g., directed out) from the cooling aperture outlet 100 into, for example, a film for cooling a downstream portion of the component second surface 70. The transition section 106 is disposed longitudinally along the longitudinal centerline 96 between and fluidly coupled with the meter section 102 and the diffuser section 104. The transition section 106 is configured to accommodate a certain degree of (e.g., lateral) misalignment between the meter section 102 and the diffuser section 104.

Misalignment may occur between different sections/portions of a cooling aperture where those cooling aperture sections are formed using different machining processes and/or at different stages. For example, misalignment may occur between the meter section 102 and the diffuser section 104 of a respective cooling aperture 64 where the diffuser section 104 is formed using a first machining process (e.g., a laser machining process) and the meter section 102 is formed using a second machining process (e.g., electrical discharge machining (EDM) process) that is different than the first machining process. Following formation of the diffuser section 104 with the first machining process, for example, a tool for the first machining process may be moved away and a tool for the second machining process may be positioned in its place (or, the component 60 may be moved from a first machining process location to a second machining process location). This swapping of the tools (or, movement of the component 60) may open the manufacturing process up to slight misalignments due to, for example, tool manipulator tolerances, etc. An unexpected misalignment may cause an undesirable flow disturbance between the meter section 102 and the diffuser section 104. The transition section 106 of the present disclosure, however, may accommodate a slight misalignment between the meter section 102 and the diffuser section 104 as discussed below in further detail. The transition section 106 may thereby reduce effects of misalignment between the meter section 102 and the diffuser section 104.

The meter section 102 of FIG. 3 extends longitudinally along the longitudinal centerline 96 within (e.g., partially into) the component substrate 74. More particularly, the meter section 102 extends longitudinally along a meter segment 108 of the longitudinal centerline 96 (e.g., a centerline of the meter section 102) from the cooling aperture inlet 98 to an outlet 110 of the meter section 102. The meter section outlet 110 of FIG. 3 is disposed vertically within the component substrate 74 intermediately between the component first surface 68 and the substrate second surface 82. The meter section outlet 110 of FIG. 3 is thereby vertically recessed into the component substrate 74 by a vertical distance 112 (e.g., along the z-axis).

The longitudinal centerline 96 and its (e.g., entire) meter segment 108 of FIG. 3 are angularly offset from the component first surface 68 by an included angle 114. This meter segment angle 114 may be an acute angle, or a right angle. The meter segment angle 114, for example, may be between ten degrees (10°) and eighty degrees (80°); e.g., between twenty degrees (20°) and thirty degrees (30°).

The meter section 102 has a longitudinal length measured along the meter segment 108 between the cooling aperture inlet 98 and the meter section outlet 110.

Figure 4:
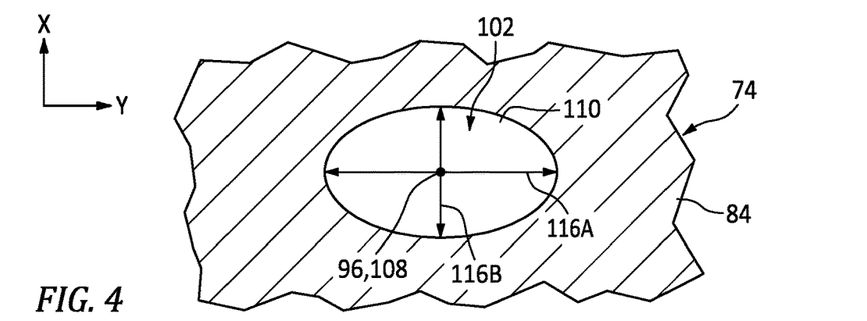
FIG. 4 is a cross-sectional illustration of a portion of the fluid cooled component at a meter section outlet of the cooling aperture.

Referring to FIG. 4, the meter section 102 has a first lateral width 116A (e.g., a major axis dimension; e.g., along the y-axis) and a second lateral width 116B (e.g., a minor axis dimension; e.g., along the x-axis). These lateral widths 116A and 116B (generally referred to as "116") may be measured, for example, along/within a plane parallel with the component first surface 68 and/or the component second surface 70; e.g., the x-y plane. The first lateral width 116A of FIG. 4 is greater than the second lateral width 116B. However, in other embodiments, the first lateral width 116A may be equal to or less than the second lateral width 116B.

The meter section 102 has a cross-sectional geometry when viewed, for example, in a (e.g., x-y plane) plane parallel with the component first surface 68 and/or the component second surface 70; e.g., the plane of FIG. 4. This meter section cross-sectional geometry may be uniform (e.g., remain constant) along the longitudinal length of the meter section 102. The meter section cross-sectional geometry of FIG. 4 has a rounded shape. Examples of the rounded shape include, but are not limited to, an oval, an ellipse and a circle. The present disclosure, however, is not limited to the foregoing exemplary meter section cross-sectional geometry shapes.

The diffuser section 104 of FIG. 3 extends longitudinally along the longitudinal centerline 96 out of the component substrate 74, through the inner coating 76 and the outer coating 78. More particularly, the diffuser section 104 of FIG. 3 extends longitudinally along a diffuser segment 116 of the longitudinal centerline 96 (e.g., a centerline of the diffuser section 104) from an inlet 118 of the diffuser section 104, through the materials 84, 88 and 94, to the cooling aperture outlet 100. The diffuser section inlet 118 of FIG. 3 is disposed vertically within the component substrate 74 intermediately between the component first surface 68 and the substrate second surface 82. The diffuser section inlet 118 of FIG. 3 is thereby vertically recessed into the component substrate 74 by a vertical distance 120 (e.g., along the z-axis), which vertical distance 120 is less than the vertical distance 112.

The longitudinal centerline 96 and its (e.g., entire) diffuser segment 116 of FIG. 3 are angularly offset from the component second surface 70 by an included angle 122. This diffuser segment angle 122 may be an acute angle. The diffuser segment angle 122, for example, may be between twenty degrees (20°) and eighty degrees (80°); e.g., between thirty-five degrees (35°) and fifty-five degrees (55°). The diffuser segment angle 122 of FIG. 3 is different (e.g., less) than the meter segment angle 114. The diffuser segment 116 may thereby be angularly offset from the meter segment 108.

The diffuser section 104 has a longitudinal length measured along the diffuser segment 116 between the diffuser section inlet 118 and the cooling aperture outlet 100. This diffuser section longitudinal length may be equal to or different (e.g., less or greater) than the meter section longitudinal length.

Figure 5:
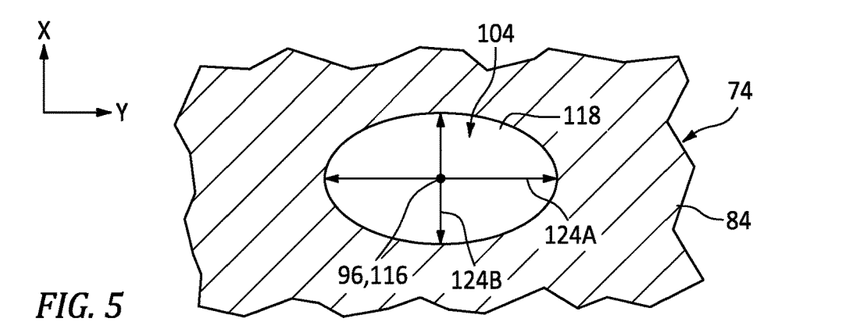
FIG. 5 is a cross-sectional illustration of a portion of the fluid cooled component at a diffuser section inlet of the cooling aperture.

Referring to FIG. 5, the diffuser section 104 has a first lateral width 124A (e.g., a major axis dimension; e.g., along the y-axis) and a second lateral width 124B (e.g., a minor axis dimension; e.g., along the x-axis). These lateral widths 124A and 124B (generally referred to as "124") may be measured, for example, along/within a plane parallel with the component first surface 68 and/or the component second surface 70; e.g., the x-y plane. The first lateral width 124A of FIG. 5 is greater than the second lateral width 124B.

However, in other embodiments, the first lateral width 124A may be equal to or less than the second lateral width 124B.

The first lateral width 124A at the diffuser section inlet 118 of FIG. 5 may be equal to (or different than) the corresponding first lateral width 116A at the meter section outlet 110 (see FIG. 4). The second lateral width 124B at the diffuser section inlet 118 of FIG. 5 may also or alternatively be equal to (or different than) the corresponding second lateral width 116B at the meter section outlet 110 (see FIG. 4). However, the lateral widths 124 of the diffuser section 104 at other locations along the longitudinal centerline 96 may be greater the corresponding lateral widths 116 of the meter section 102. More particularly, the diffuser section 104 of FIG. 3 (see also transition from FIG. 5 to FIG. 6) laterally diverges as the diffuser section 104 projects longitudinally away from the meter section 102 (and the transition section 106) towards or to the cooling aperture outlet 100.

Referring to FIG. 5, the diffuser section 104 has a cross-sectional geometry when viewed, for example, in a plane parallel with the component first surface 68 and/or the component second surface 70; e.g., the x-y plane. At the diffuser section inlet 118, the diffuser section cross-sectional geometry may be the same as the meter section cross-sectional geometry at the meter section outlet 110 (see FIG. 4). The diffuser section cross-sectional geometry of FIG. 5, for example, has a rounded shape. Examples of the rounded shape include, but are not limited to, an oval, an ellipse and a circle. The present disclosure, however, is not limited to the foregoing exemplary diffuser section cross-sectional geometry shapes. Furthermore, in other embodiments, the diffuser section cross-sectional geometry (e.g., its size and/or shape) at the diffuser section inlet 118 may be different than the meter section cross-sectional geometry at the meter section outlet 110.

Figure 6:
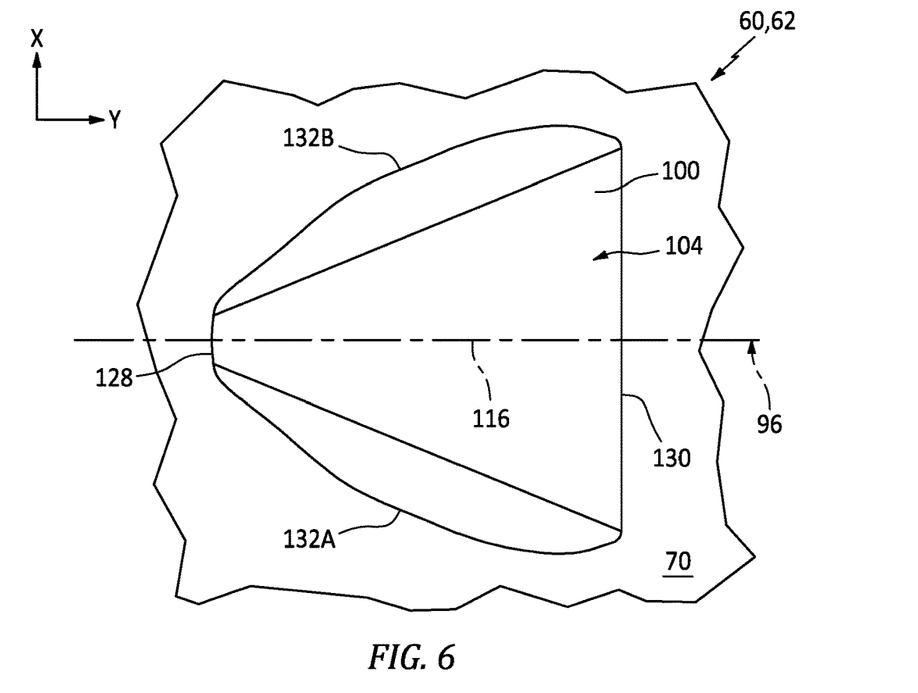
FIG. 6 is a side illustration of a portion of the fluid cooled component at an outlet of the cooling aperture.

Referring to FIGS. 3, 5 and 6, a shape and/or dimensions of the diffuser section cross-sectional geometry change as the diffuser section 104 projects longitudinally away from the meter section 102 (and the transition section 106), e.g. sequentially through the materials 84, 88 and 94 of FIG. 3, to the cooling aperture outlet 100. For example, at the cooling aperture outlet 100 of FIG. 6, the diffuser section cross-sectional geometry may have a complex shape when viewed, for example, in a plane parallel with the component first surface 68 and/or the component second surface 70; e.g., the x-y plane. This diffuser section cross-sectional geometry of FIG. 6 includes a (e.g., curved or straight) leading edge section 128, a (e.g., curved or straight) trailing edge section 130 and opposing (e.g., curved or straight; concave, convex and/or splined) sidewall sections 132A and 132B (generally referred to as "132"). Each of the sidewall sections 132 extends between and to respective ends of the leading and the trailing edge sections 128 and 130. A lateral width of the leading edge section 128 may be different (e.g., smaller) than a lateral width of the trailing edge section 130. The sidewall sections 132 may thereby generally laterally diverge away from one another as the sidewall sections 132 extend from the leading edge section 128 to the trailing edge section 130.

Figure 7:
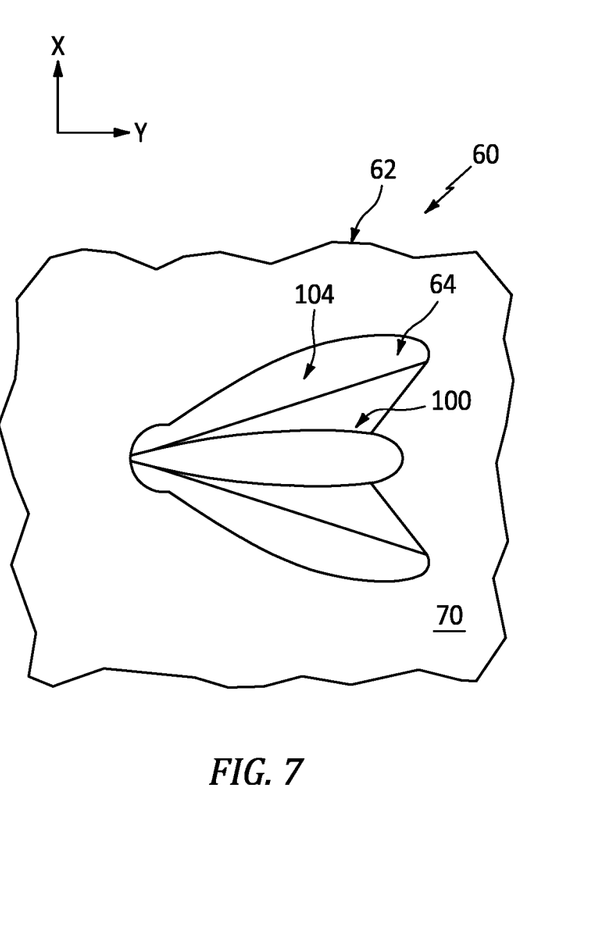
FIGS. 7 and 8 are side illustrations of portions of the fluid cooled component configured with various multi-lobed cooling apertures.
Figure 8:
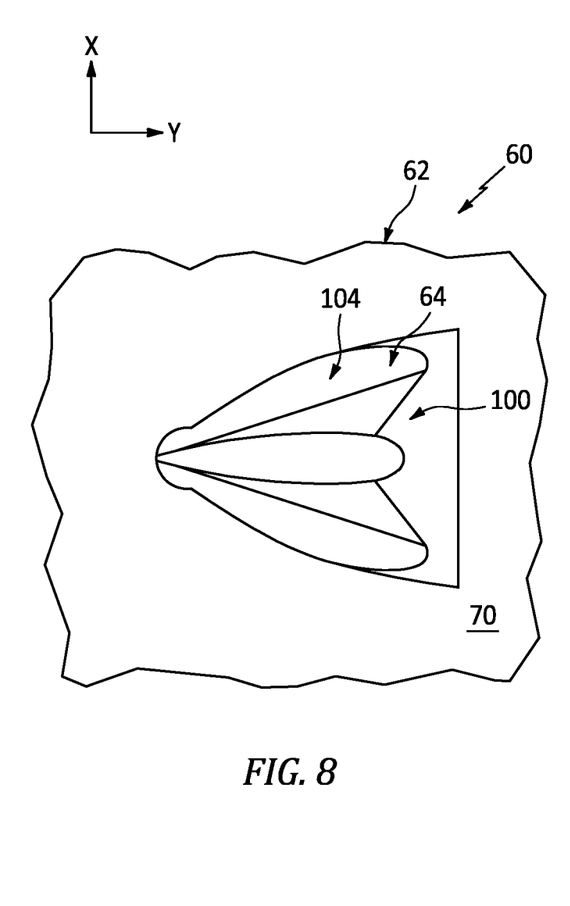

In some embodiments, referring to FIG. 6, the diffuser section 104 may be configured as a single lobe diffuser section. In other embodiments, referring to FIGS. 7 and 8, the diffuser section 104 may be configured as a multi-lobe diffuser section. Various other single lobe and multi-lobe diffuser sections for cooling apertures are known in the art, and the present disclosure is not limited to any particular ones thereof. Further details on various multi-lobe diffuser sections can be found in U.S. Pat. No. 9,598,979, which is assigned to the assignee of the present disclosure and hereby incorporated herein by reference in its entirety.

The transition section 106 of FIG. 3 extends longitudinally along the longitudinal centerline 96 within the component substrate 74 between and to the meter section 102 and the diffuser section 104. More particularly, the transition section 106 of FIG. 3 extends longitudinally along a transition segment 134 of the longitudinal centerline 96 (e.g., a centerline of the transition section 106) from the meter section outlet 110 (e.g., a meter-transition section interface), through the substrate material 84, to the diffuser section inlet 118 (e.g., a diffuser-transition section interface).

The transition segment 134 of FIG. 3 may follow a trajectory of and/or may be parallel (e.g., coaxial) with the meter segment 108. However, in other embodiments, the transition segment 134 may follow a trajectory of and/or may be parallel (e.g., coaxial) with the diffuser segment 116, or otherwise.

The transition section 106 has a longitudinal length measured along the transition segment 134 between the meter section outlet 110 and the diffuser section inlet 118. This transition section longitudinal length may be different (e.g., less) than meter section longitudinal length and/or the diffuser section length.

Figure 9:
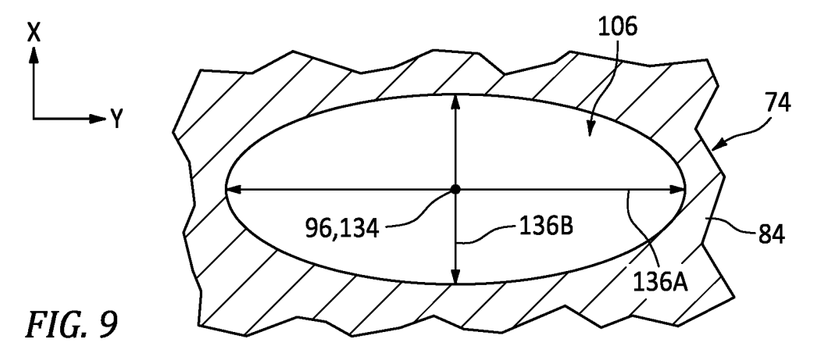
FIG. 9 is a cross-sectional illustration of a portion of the fluid cooled component at a meter section end of a transition section of the cooling aperture.

Referring to FIG. 9, the transition section 106 has a first lateral width 136A (e.g., a major axis dimension; e.g., along the y-axis) and a second lateral width 136B (e.g., a minor axis dimension; e.g., along the x-axis). These lateral widths 136A and 136B (generally referred to as "136") may be measured, for example, along/within a plane parallel with the component first surface 68 and/or the component second surface 70; e.g., the x-y plane. The first lateral width 136A of FIG. 9 is greater than the second lateral width 136B. However, in other embodiments, the first lateral width 136A may be equal to or less than the second lateral width 136B.

Referring still to FIG. 9, the first lateral width 136A at the meter section outlet 110 (see FIG. 3) may be different (e.g., greater) than the corresponding first lateral width 116A at the meter section outlet 110 (see FIG. 4) and/or the corresponding first lateral width 124A at the diffuser section inlet 118 (see FIG. 5). The second lateral width 136B at the meter section outlet 110 may also or alternatively be different (e.g., greater) than the corresponding second lateral width 116B at the meter section outlet 110 (see FIG. 4) and/or corresponding the second lateral width 124B at the diffuser section inlet 118 (see FIG. 5). However, referring to FIG. 10, the first lateral width 136A at the diffuser section inlet 118 may be equal to (or different than) the corresponding first lateral width 116A at the meter section outlet 110 (see FIG. 4) and/or the corresponding first lateral width 124A at the diffuser section inlet 118 (see FIG. 5). The second lateral width 136B at the diffuser section inlet 118 may also or alternatively be equal to (or different than) the corresponding second lateral width 116B at the meter section outlet 110 (see FIG. 4) and/or the corresponding second lateral width 124 at the diffuser section inlet 118 (see FIG. 5). The transition section 106 of FIG. 3 (see also transition from FIG. 9 to FIG. 10) laterally diverges as the transition section 106 projects longitudinally away from the diffuser section 104 towards the meter section 102. Referring to FIG. 11, with the foregoing configuration, a footprint 138 of the meter section 102 at the meter section outlet 110 may fit within a footprint 140 of the transition section 106 at the meter section outlet 110, where the footprints 138 and 140 are viewed in a common plane; e.g., a plane parallel with the component first surface 68 and/or the component second surface 70.

Figure 10:
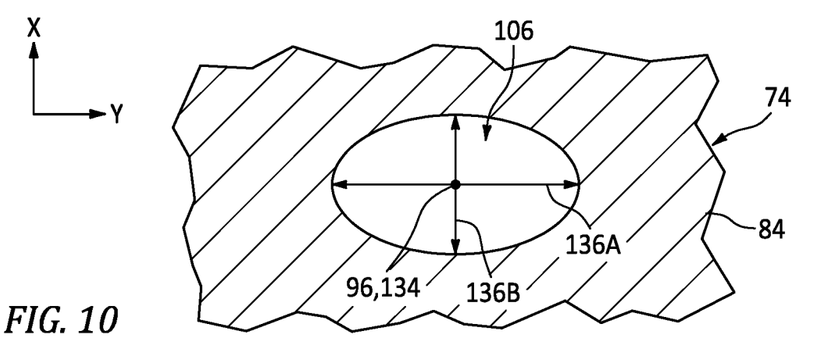
FIG. 10 is a cross-sectional illustration of a portion of the fluid cooled component at a diffuser section end of the transition section of the cooling aperture.
Figure 11:
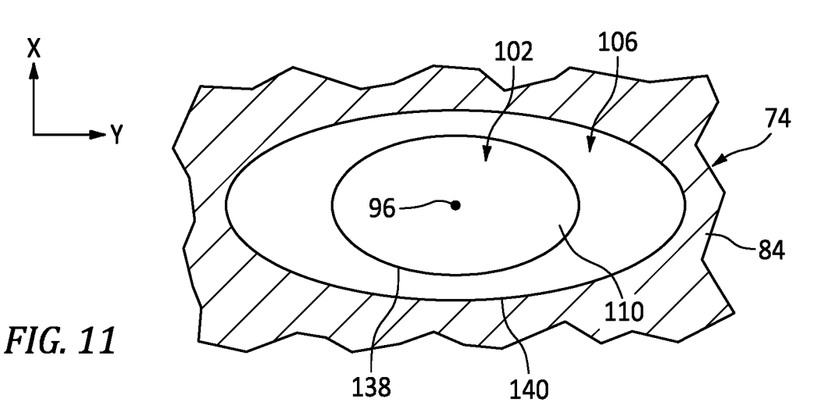
FIG. 11 is a cross-sectional illustration of a portion of the fluid cooled component depicting overlap at an interface between the transition section and the meter section.

Referring to FIG. 10, the transition section 106 has a cross-sectional geometry when viewed, for example, in a plane parallel with the component first surface 68 and/or the component second surface 70; e.g., the x-y plane. At the diffuser section inlet 118 (see FIG. 3), the transition section cross-sectional geometry may be the same as the diffuser section cross-sectional geometry (see FIG. 5). The transition section cross-sectional geometry of FIG. 10, for example, has a rounded shape. Examples of the rounded shape include, but are not limited to, an oval, an ellipse and a circle. The present disclosure, however, is not limited to the foregoing exemplary transition section cross-sectional geometry shapes. The transition section cross-sectional geometry at the diffuser section inlet 118 may also be the same as the meter section cross-sectional geometry at the meter section outlet 110 (see FIG. 4).

Referring to FIGS. 3, 9 and 10, a shape and/or dimensions of the transition section cross-sectional geometry change as the transition section 106 projects longitudinally away from the meter section 102 to the diffuser section 104. For example, at the meter section outlet 110 of FIG. 11, the footprint 140 of the transition section cross-sectional geometry is configured to (e.g., completely) circumscribe/envelope/overlap the footprint 138 of the meter section 102. As described above, the transition section cross-sectional geometry may be dimensioned greater than the meter section cross-sectional geometry at the meter section outlet 110. In addition or alternatively, the transition section cross-sectional geometry may be selectively shaped different than the meter section cross-sectional geometry at the meter section outlet 110.

Figure 12A:
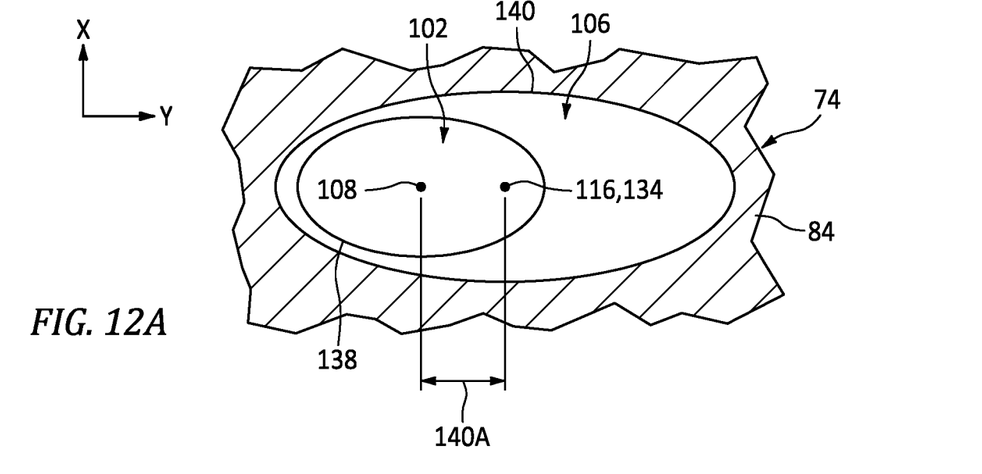
FIGS. 12A and 12B are cross-sectional illustrations depicting the overlap at the interface between the transition section and the meter section, where the transition section and the meter section are laterally misaligned along a y-axis.
Figure 12B:
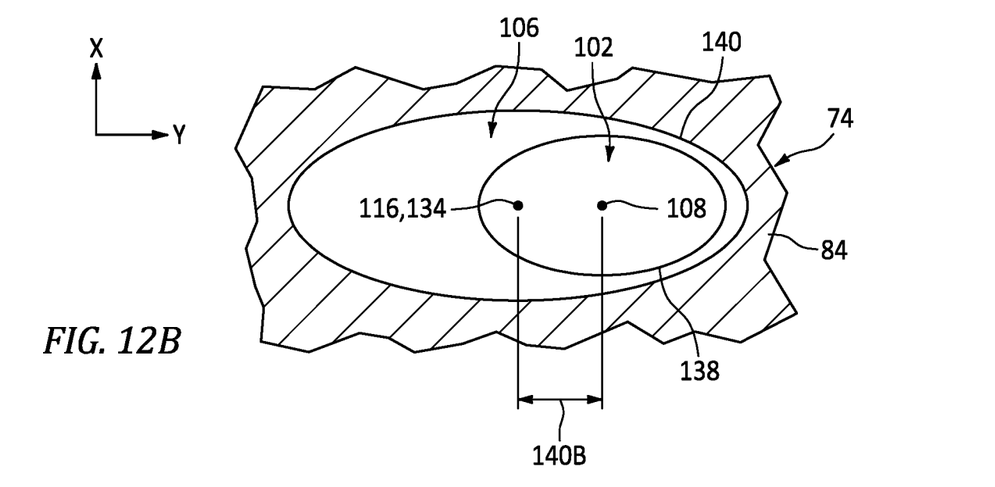
Figure 13A:
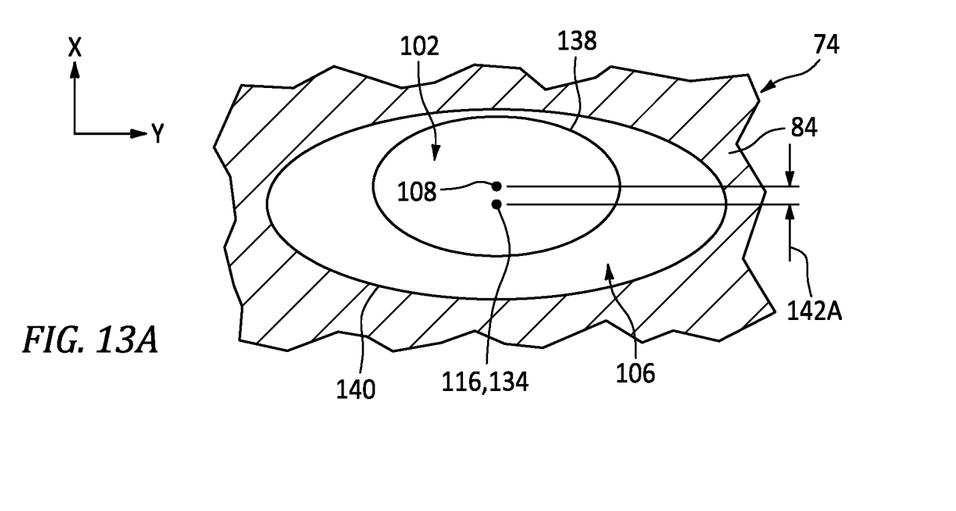
FIGS. 13A and 13B are cross-sectional illustrations depicting the overlap at the interface between the transition section and the meter section, where the transition section and the meter section are laterally misaligned along an x-axis.
Figure 13B:
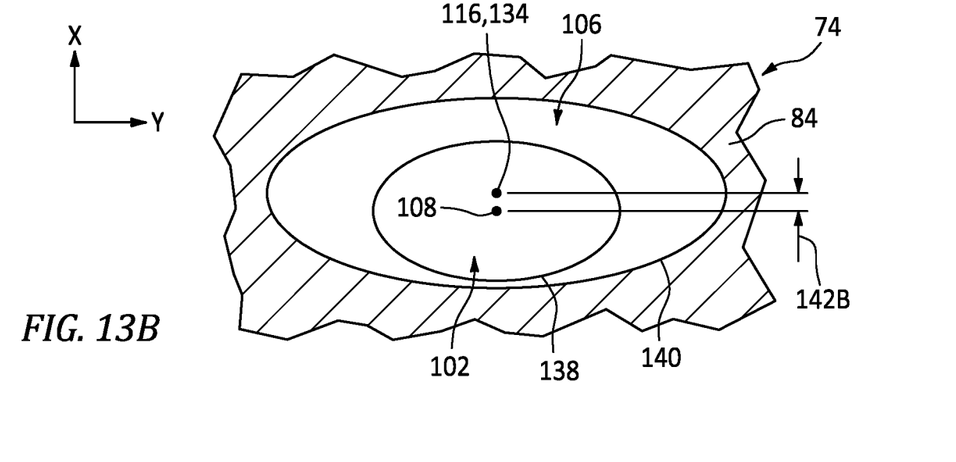
Figure 14:
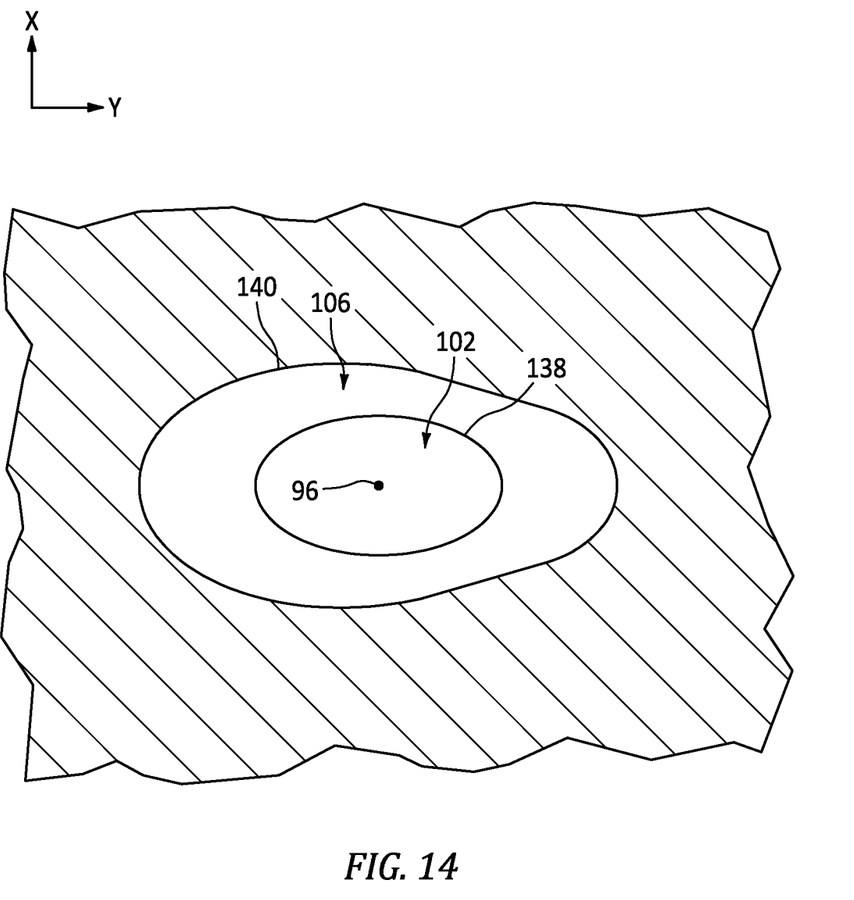
FIG. 14 is a cross-sectional illustration of a portion of the fluid cooled component depicting overlap at another interface between the transition section and the meter section.

The size and/or the shape of the transition section cross-sectional geometry at the meter section outlet 110 may be tailored to accommodate slight (e.g., forward or backward) lateral misalignment (e.g., along the y-axis) as shown, for example, in FIGS. 12A and 12B. Here, the transition segment 134 and/or the diffuser segment 116 may be laterally offset from the meter segment 108 by a lateral distance 140A, 140B (e.g., along the y-axis). The size and/or the shape of the transition section cross-sectional geometry at the meter section outlet 110 may also or alternatively be tailored to accommodate slight (e.g., side-to-side) lateral misalignment (e.g., along the x-axis) as shown, for example, in FIGS. 13A and 13B. Here, the transition segment 134 and/or the diffuser segment 116 may be laterally offset from the meter segment 108 by a lateral distance 142A, 142B (e.g., along the x-axis). The size and/or the shape of the transition section cross-sectional geometry at the meter section outlet 110 may also or alternatively be tailored to accommodate more lateral misalignment in one direction than another direction as shown, for example, in FIG. 14.

Referring to FIG. 3, the transition section 106 may form a (e.g., annular or arcuate) groove 144 within the sidewall 62. This groove 144 extends circumferentially about (e.g., partially or completely around) the longitudinal centerline 96. The groove 144 extends laterally into the substrate material 84 to a groove end surface 146. The groove 144 extends longitudinally within the substrate material 84 between the meter section 102 and its outlet 110 and the diffuser section 104 and its inlet 118. The groove 144 abuts longitudinally against/is formed by a (e.g., annular or arcuate) shoulder 148 (e.g., a shelf, a ledge, a rim, etc.) formed at an interface 150 between the transition section 106 and the meter section 102. The groove 144 of FIG. 3 may facilitate complete (e.g., relatively unobstructed) fluid communication from the meter section 102 to the diffuser section 104 through the transition section 106 even where, for example, the meter section 102 and the diffuser section 104 are slightly misaligned; e.g., the meter segment 108 is laterally offset from and/or non-coincident with the diffuser segment 116 (see FIGS. 12A-13B).

Figure 15A:
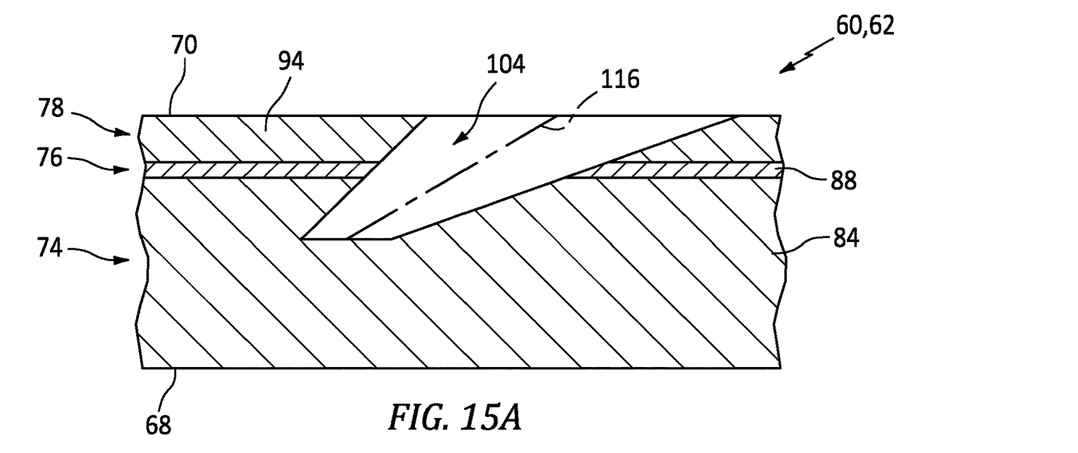
FIGS. 15A-C are sectional illustrations depicting a sequence of steps for forming the cooling aperture in the fluid cooled component.
Figure 15B:
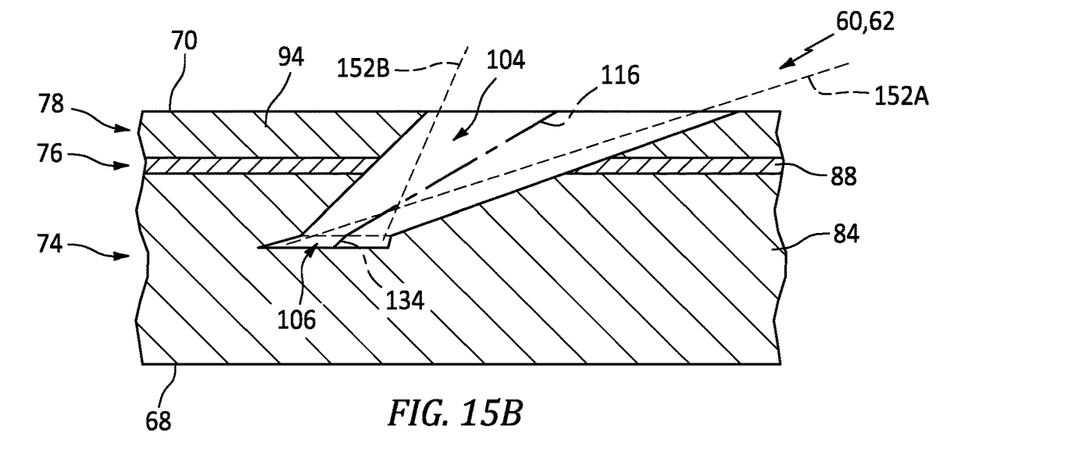
Figure 15C:
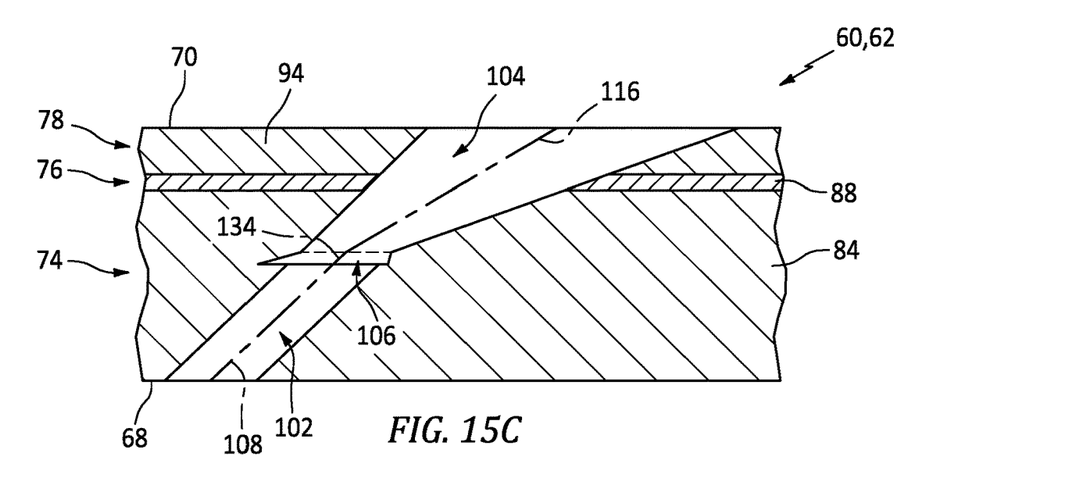

FIGS. 15A-C illustrate an exemplary sequence of steps for forming the cooling aperture 64. Referring to FIG. 15A, the diffuser section 104 is formed (e.g., laser machined) in the fluid cooled component 60 and its sidewall 62. Referring to FIG. 15B, the transition section 106 is formed (e.g., laser machined) in the fluid cooled component 60 and its sidewall 62. The forming of at least a portion (or an entirety) of the transition section 106 may be performed concurrently with (e.g., at a tail end of) the formation of the diffuser section 104. Alternatively, the transition section 106 may be formed during a separate process step from the formation of the diffuser section 104. FIG. 15B also illustrates exemplary energy beam paths 152A and 152B for forming an outer peripheral portion of the transition section 106. Referring to FIG. 15C, the meter section 102 is formed (e.g., electrical discharge machined) in the fluid cooled component 60 and its sidewall 62. Of course, various other formation processes may be used to at least partially or completely form any one or more of the sections 102, 104 and/or 106.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a turbine engine, comprising:
a turbine engine component including a sidewall and a cooling aperture;
the cooling aperture including an inlet, an outlet, a meter section, a diffuser section and a transition section, the transition section between and fluidly coupled with the meter section and the diffuser section, and the cooling aperture extending through the sidewall from the inlet to the outlet;
the meter section at the inlet;
the diffuser section at the outlet; and
the transition section configured to accommodate lateral misalignment between the meter section and the diffuser section, wherein a groove having an annular shoulder is formed at a first interface between the meter section and the transition section.

2. The apparatus of claim 1, wherein a cross-sectional geometry of the meter section at the first interface is different than a cross-sectional geometry of the transition section at the first interface.

3. The apparatus of claim 2, wherein a shape of the cross-sectional geometry of the meter section at the first interface is different than a shape of the cross-sectional geometry of the transition section at the first interface.

4. The apparatus of claim 2, wherein a dimension of the cross-sectional geometry of the meter section at the first interface is different than a corresponding dimension of the cross-sectional geometry of the transition section at the first interface.

5. The apparatus of claim 2, wherein
the diffuser section meets the transition section at a second interface; and
the diffuser section and the transition section share a common cross-sectional geometry at the second interface.

6. The apparatus of claim 1, wherein a centerline of the diffuser section is laterally misaligned with a centerline of the meter section.

7. The apparatus of claim 6, wherein a centerline of the transition section is laterally aligned with the centerline of the diffuser section.

8. The apparatus of claim 1, wherein
the sidewall includes a substrate and an outer coating applied over the substrate;
the meter section and the transition section are formed in the substrate; and
the diffuser section is formed in the substrate and the outer coating.

9. The apparatus of claim 8, wherein
the sidewall further includes an inner coating between the outer coating and the substrate; and
the diffuser section is further formed in the inner coating.

10. The apparatus of claim 1, wherein the diffuser section comprises a single lobe diffuser section.

11. The apparatus of claim 1, wherein the diffuser section comprises a multi-lobe diffuser section.

12. The apparatus of claim 1, wherein the turbine engine component is configured as an airfoil for the turbine engine.

13. The apparatus of claim 1, wherein the turbine engine component is configured as a flowpath sidewall for the turbine engine.

14. An apparatus for a turbine engine, comprising:
a turbine engine component including a wall and a cooling aperture;
the cooling aperture extending through the wall, and the cooling aperture including a meter section, a diffuser section and a transition section, and the transition section between and fluidly coupled with the first meter section and the diffuser section;
the transition section meeting the first meter section at a first interface, wherein a cross-sectional geometry of the transition section at the first interface is different than a cross-sectional geometry of the first meter section at the first interface;
the transition section meeting the diffuser section at a second interface, wherein the transition section and the diffuser section share a common cross-sectional geometry at the second interface; and
the transition section laterally tapering as the transition section extends within the wall from the diffuser section to the meter section.

15. The apparatus of claim 14, wherein
the cooling aperture further includes an inlet and an outlet;
the meter section extends within the wall from the inlet to the transition section; and
the diffuser section extends within the wall from the transition section to the outlet.

16. An apparatus for a turbine engine, comprising:
a turbine engine component including a wall and a cooling aperture, the turbine engine component configured as an airfoil or a flowpath wall for the turbine engine;
the cooling aperture extending through the wall, the cooling aperture including a first section, a second section and a transition section, and the transition section between and fluidly coupled with the first section and the second section; and
the transition section forming an annular groove within the wall, the annular groove projecting laterally into the wall, and the annular groove extending longitudinally within the wall between the first section and the second section.

17. The apparatus of claim 16, wherein the second section comprises a multi-lobe diffuser section.

* * * * *